(12) United States Patent
Huang

(10) Patent No.: US 12,393,541 B2
(45) Date of Patent: Aug. 19, 2025

(54) MICROCONTROLLER, METHOD, AND ELECTRONIC SYSTEM FOR LOGIC ANALYSIS

(71) Applicant: Wistron Corp., New Taipei (TW)

(72) Inventor: Kuo-Ting Huang, New Taipei (TW)

(73) Assignee: WISTRON CORP, New Taipei (TW)

( * ) Notice: Subject to any disclaimer, the term of this patent is extended or adjusted under 35 U.S.C. 154(b) by 114 days.

(21) Appl. No.: 18/060,072

(22) Filed: Nov. 30, 2022

(65) Prior Publication Data

US 2024/0054088 A1 Feb. 15, 2024

(30) Foreign Application Priority Data

Aug. 11, 2022 (TW) .................................. 111130178

(51) Int. Cl.
G06F 13/40 (2006.01)
(52) U.S. Cl.
CPC .............................. G06F 13/4059 (2013.01)
(58) Field of Classification Search
CPC ...................................................... G06Q 40/12
See application file for complete search history.

(56) References Cited

U.S. PATENT DOCUMENTS 6,760,898 B1 * 7/2004 Sanchez ......... G01R 31/318519
716/111
7,809,991 B2 10/2010 Johnson et al.
2006/0294441 A1 12/2006 Cheng et al.
2013/0054931 A1 * 2/2013 Zhong ................ G01R 31/3177
711/E12.005
2019/0026416 A1 * 1/2019 Mahajan ................ G06F 11/25

FOREIGN PATENT DOCUMENTS

| CN | 1774700 A | 5/2006 |
| CN | 100458711 C | 2/2009 |
| TW | I308690 B | 4/2009 |
| WO | 2004/099987 A1 | 11/2004 |

OTHER PUBLICATIONS

Chinese language office action dated Apr. 21, 2023, issued in application No. TW 111130178.
Indian language office action (with English translation) dated Mar. 21, 2024, issued in application IN 202324004487.

* cited by examiner

*Primary Examiner* — Henry Tsai
*Assistant Examiner* — Juanito C Borromeo
(74) *Attorney, Agent, or Firm* — McClure, Qualey & Rodack, LLP

(57) ABSTRACT

A microcontroller, a method, and an electronic system for logic analysis are provided. The microcontroller includes a counting unit, a control unit, and a buffer unit. The counting unit counts with a preset period and outputs a count value. The control unit is coupled to the counting unit and receives a plurality of data and the count value. The buffer unit is coupled to the control unit and performs First In, First Out (FIFO) operations. In response to state transition of at least one datum, the control unit records the current state of the data and the count value and thereby generates transmission data. The control unit then stores the transmission data in the buffer unit.

20 Claims, 6 Drawing Sheets

MICROCONTROLLER, METHOD, AND ELECTRONIC SYSTEM FOR LOGIC ANALYSIS

CROSS REFERENCE TO RELATED APPLICATIONS

This application claims the benefit of Taiwan Application No. 111130178, filed on Aug. 11, 2022, the entirety of which is incorporated by reference herein.

BACKGROUND OF THE DISCLOSURE

Field of the Invention

The present invention relates to an electronic device, and, in particular, to a microcontroller, a method, and an electronic system for logic analysis.

Description of the Related Art

One problem in the design and development process of server computer motherboards is that it may be difficult to clarify the direction in a short time, or to reproduce a phenomenon. Therefore, it is always necessary to solder jumpers out of many suspicious related signals one by one, and then to use a logic analyzer to observe the state of each signal to find the problem.

However, if it is necessary to use the entire system, and a printed circuit board assembly (PCBA) cannot be used for debugging due to the limitations of the necessary conditions for design or reproduction, it will be difficult to solder jumpers and to connect these jumpers to each input on the logic analyzer. In addition, the length of time that the logic analyzer may observe is also limited by the memory allocated on the computer. It is possible that the allocated memory may be full, in which case the previously valuable data will be overwritten, resulting in erroneous judgement, or missed observation of the signal state at a critical moment.

BRIEF SUMMARY OF THE DISCLOSURE

In view of this, the embodiments of the present disclosure provide a microcontroller, a method and an electronic system for logic analysis. There is no limitation on the length of recording time in use, and the signal to be observed is flexible and may be arbitrarily changed, so that the server computer motherboard is no longer just a motherboard, but also an invisible logic analyzer built into the motherboard. The real signal waveform may be obtained automatically without using a soldering iron to solder jumpers and without the need to use a logic analyzer.

An embodiment of the present disclosure provides a microcontroller for logic analysis. The microcontroller includes a counting unit, a control unit, and a buffer unit. The counting unit counts with a preset period and outputs a count value. The control unit is coupled to the counting unit and receives a plurality of data and the count value. The buffer unit is coupled to the control unit and performs First In, First Out (FIFO) operations. In response to state transition of at least one datum, the control unit records the current state of the data and the count value. The control unit thereby generates transmission data, which is stored in the buffer unit.

An embodiment of the present disclosure provides a method for logic analysis. The method includes the stages as detailed in the following paragraph. The method counts in response to a preset period, and outputs a count value. A plurality of data and the count value are received. The current state of the data and the count value are recorded in response to state transition of at least one datum. Transmission data are generated, and the transmission data are stored. FIFO operations are performed in response to the transmission data.

An embodiment of the present disclosure provides an electronic system for logic analysis. The electronic system includes a microcontroller, a communication processor, a central processing unit, and a display. The microcontroller counts with a preset period and receives a plurality of data. In response to state transition of at least one datum of the data, the microcontroller records the current state of the data and the count value. The microcontroller thereby generates transmission data and performs FIFO operations. The communication processor is coupled to the microcontroller. The communication processor receives the transmission data from the microcontroller and decodes the transmission data to generate decoded data. The central processing unit is coupled to the communication processor. The central processing unit performs an application to generate a user-interface signal. The display is coupled to the central processing unit. The display displays according to the user-interface signal. The central processing unit reads the decoded data and displays waveforms of the data correspondingly through the display according to the state of the data and the count value.

BRIEF DESCRIPTION OF THE DRAWINGS

The disclosure may be more fully understood by reading the subsequent detailed description with references made to the accompanying figures. It should be understood that the figures are not drawn to scale in accordance with standard practice in the industry. In fact, it is allowed to arbitrarily enlarge or reduce the size of components for clear illustration. This means that many special details, relationships and methods are disclosed to provide a complete understanding of the disclosure.

DETAILED DESCRIPTION OF THE DISCLOSURE

Figure 1:
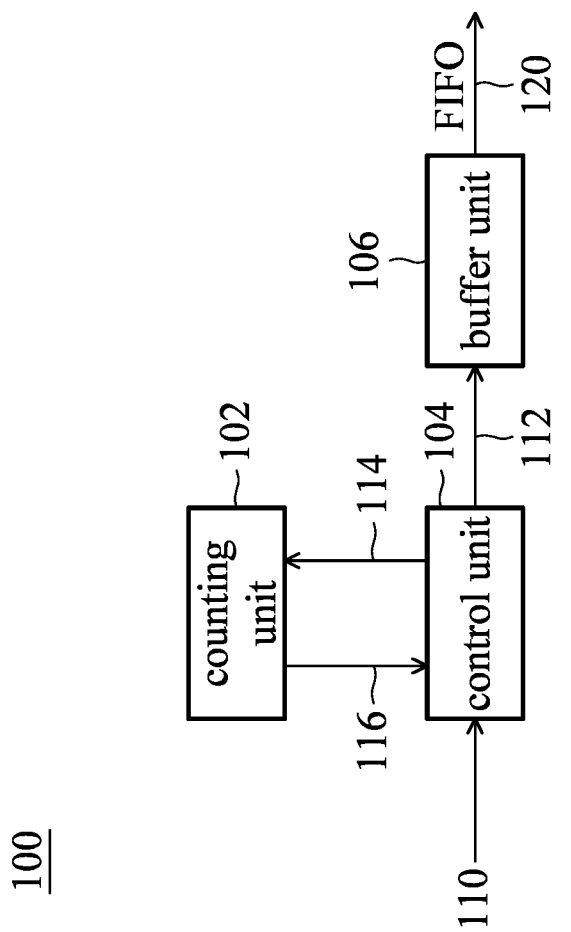
FIG. 1 is a schematic diagram of a microcontroller 100 for logic analysis in accordance with some embodiments of the present disclosure.

In order to make the above purposes, features, and advantages of some embodiments of the present disclosure more comprehensible, the following is a detailed description in conjunction with the accompanying drawing.

Certain terms are used throughout the description and following claims to refer to particular components. As one skilled in the art will understand, electronic equipment manufacturers may refer to a component by different names. This document does not intend to distinguish between components that differ in name but not function. It is understood that the words "comprise", "have" and "include" are used in an open-ended fashion, and thus should be interpreted to mean "include, but not limited to . . . ". Thus, when the terms "comprise", "have" and/or "include" used in the present disclosure are used to indicate the existence of specific technical features, values, method steps, operations, units and/or components. However, it does not exclude the possibility that more technical features, numerical values, method steps, work processes, units, components, or any combination of the above may be added.

The directional terms used throughout the description and following claims, such as: "on", "up", "above", "down", "below", "front", "rear", "back", "left", "right", etc., are only directions referring to the drawings. Therefore, the directional terms are used for explaining and not used for limiting the present disclosure. Regarding the drawings, the drawings show the general characteristics of methods, structures, and/or materials used in specific embodiments. However, the drawings should not be construed as defining or limiting the scope or properties encompassed by these embodiments. For example, for clarity, the relative size, thickness, and position of each layer, each area, and/or each structure may be reduced or enlarged.

When the corresponding component such as layer or area is referred to as being "on another component", it may be directly on this other component, or other components may exist between them. On the other hand, when the component is referred to as being "directly on another component (or the variant thereof)", there is no component between them. Furthermore, when the corresponding component is referred to as being "on another component", the corresponding component and the other component have a disposition relationship along a top-view/vertical direction, the corresponding component may be below or above the other component, and the disposition relationship along the top-view/vertical direction is determined by the orientation of the device.

It should be understood that when a component or layer is referred to as being "connected to" another component or layer, it may be directly connected to this other component or layer, or intervening components or layers may be present. In contrast, when a component is referred to as being "directly connected to" another component or layer, there are no intervening components or layers present.

The electrical connection or coupling described in this disclosure may refer to direct connection or indirect connection. In the case of direct connection, the endpoints of the components on the two circuits are directly connected or connected to each other by a conductor line segment, while in the case of indirect connection, there are switches, diodes, capacitors, inductors, resistors, other suitable components, or a combination of the above components between the endpoints of the components on the two circuits, but the intermediate component is not limited thereto.

The words "first", "second", "third", "fourth", "fifth", and "sixth" are used to describe components. They are not used to indicate the priority order of or advance relationship, but only to distinguish components with the same name.

It should be noted that the technical features in different embodiments described in the following may be replaced, recombined, or mixed with one another to constitute another embodiment without departing from the spirit of the present disclosure.

FIG. 1 is a schematic diagram of a microcontroller 100 for logic analysis in accordance with some embodiments of the present disclosure. As shown in FIG. 1, the microcontroller 100 includes a counting unit 102, a control unit 104, and a buffer unit 106. In some embodiments, the microcontroller 100 is a complex programmable logic device (CPLD) or a field programmable gate array (FPGA), but the present disclosure is not limited thereto. In some embodiments, the counting unit 102 counts with a preset period and outputs a count value 116. For example, the preset period is 10 nanoseconds, but the present disclosure is not limited thereto. The preset period (for example, 10 nanoseconds) is the precision when the microcontroller 100 captures the data (or signal) state.

The control unit 104 receives a plurality of data 110 from outside the microcontroller 100, and the control unit 104 is coupled to the counting unit 102 to receive the count value 116 from the counting unit 102. In some embodiments, the data 110 from outside the microcontroller 100 may, for example, come from a central processing unit (CPU), a baseboard management controller (BMC), or a platform controller hub (PCH), but the present disclosure is not limited thereto. In some embodiments, in response to the state transition of at least one datum of the data 110, the control unit 104 records the current state of the data 110 and the count value 116. The control unit 104 thereby generates transmission data 112, which it stores in the buffer unit 106. After that, the buffer unit 106 performs FIFO operations on the transmission data 112 and outputs the transmission data 120. In some embodiments, the buffer unit 106 performs FIFO operations on the transmission data 112 according to the sequence of the count value 116 in the transmission data 112.

In some embodiments, the state transition may be, for example, a transition from a logic low level to a logic high level, or a transition from a logic high level to a logic low level. In some embodiments, in response to the state transition of at least one datum of the data 110, the control unit 104 outputs a reset signal 114 to the counting unit 102, so that the count value 116 of the counting unit 102 returns to zero. In some embodiments, when the state transition of all the data 110 does not occur, but the count value 116 of the counting unit 102 is the maximum value, the control unit 104 outputs the reset signal 114 to the counting unit 102, and the counting unit 102 resets the count value 116 to zero in response to the reset signal 114.

Figure 2:
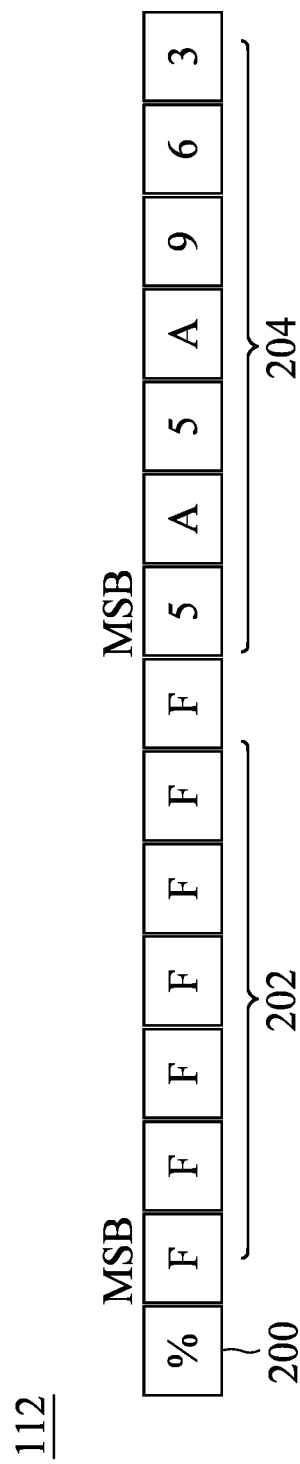
FIG. 2 is a schematic diagram of the data structure of transmission data 112 in FIG. 1 in accordance with some embodiments of the present disclosure.

FIG. 2 is a schematic diagram of the data structure of transmission data 112 in FIG. 1 in accordance with some embodiments of the present disclosure. As shown in FIG. 2, the transmission data 112 includes an indicator 200, a timestamp 202, and a signal datum 204. In some embodiments, the indicator 200 is the starting character of the transmission data. The length of the indicator 200 is one character long, for example, the character %. However, the present disclosure does not limit the character type and the character length of the indicator 200. In some embodiments, the timestamp 202 is the count value 116 when the state transition of at least one datum of the data 110 occurs. The length of the timestamp 202 may be seven characters long, for example, the character string FFFFFFF. The character F in the timestamp 202 adjacent to the indicator 200 is the most significant character (MSB). In some embodiments of FIG. 2, when the preset period is 10 nanoseconds (ns), the time period when the 7-character timestamp 202 (e.g., 28 bits) counts from zero to the maximum value is 2.7 seconds (268435455*10 ns=2.7 s). The present disclosure does not limit the character type and the character length of the timestamp 202.

In some embodiments, the signal datum 204 is the state of the data 110 when the state transition of said datum of the data 110 occurs. The length of the signal datum 204 is at least one character long. In some embodiments of FIG. 2, the length of the signal datum 204 is seven characters long, for example, the character string 5A5A963. Character 5 in the signal datum 204 adjacent to the timestamp 202 is the most significant character (MSB).

Figure 3:
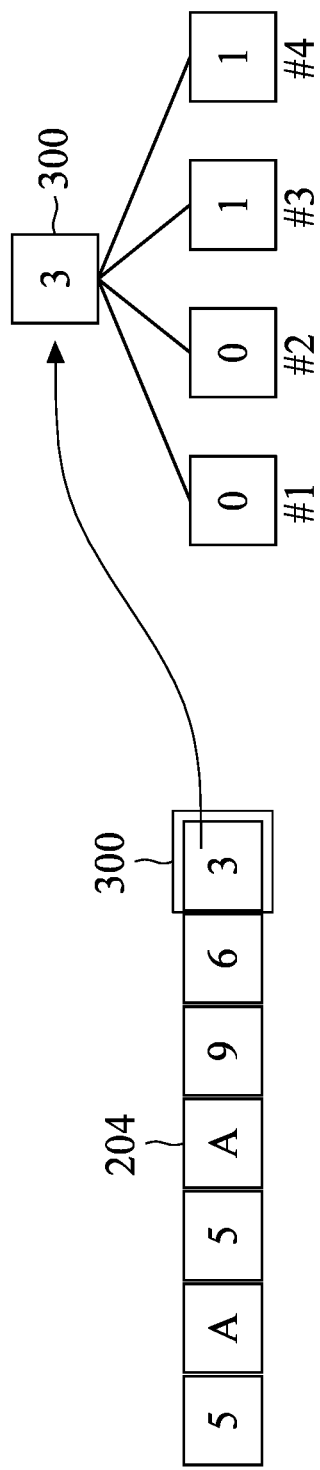
FIG. 3 is a schematic diagram of the data structure of a signal datum 204 in the transmission data 112 in FIG. 2 in accordance with some embodiments of the present disclosure.

FIG. 3 is a schematic diagram of the data structure of a signal datum 204 in the transmission data 112 in FIG. 2 in accordance with some embodiments of the present disclosure. As shown in FIG. 3, taking character 3 in block 300 as an example, character 3 may indicate the states of four data, for example, signal #1 is at a logic low level (0), signal #2 is at the logic low level (0), signal #3 is at a logic high level (1), and signal #4 is at the logic high level (1). In summary, one character in the signal datum 204 may indicate the states of four data in the data 110. Therefore, seven characters in the signal datum 204 may indicate the states of 28 (7*4=28) data in the data 110 in total.

Figure 4:
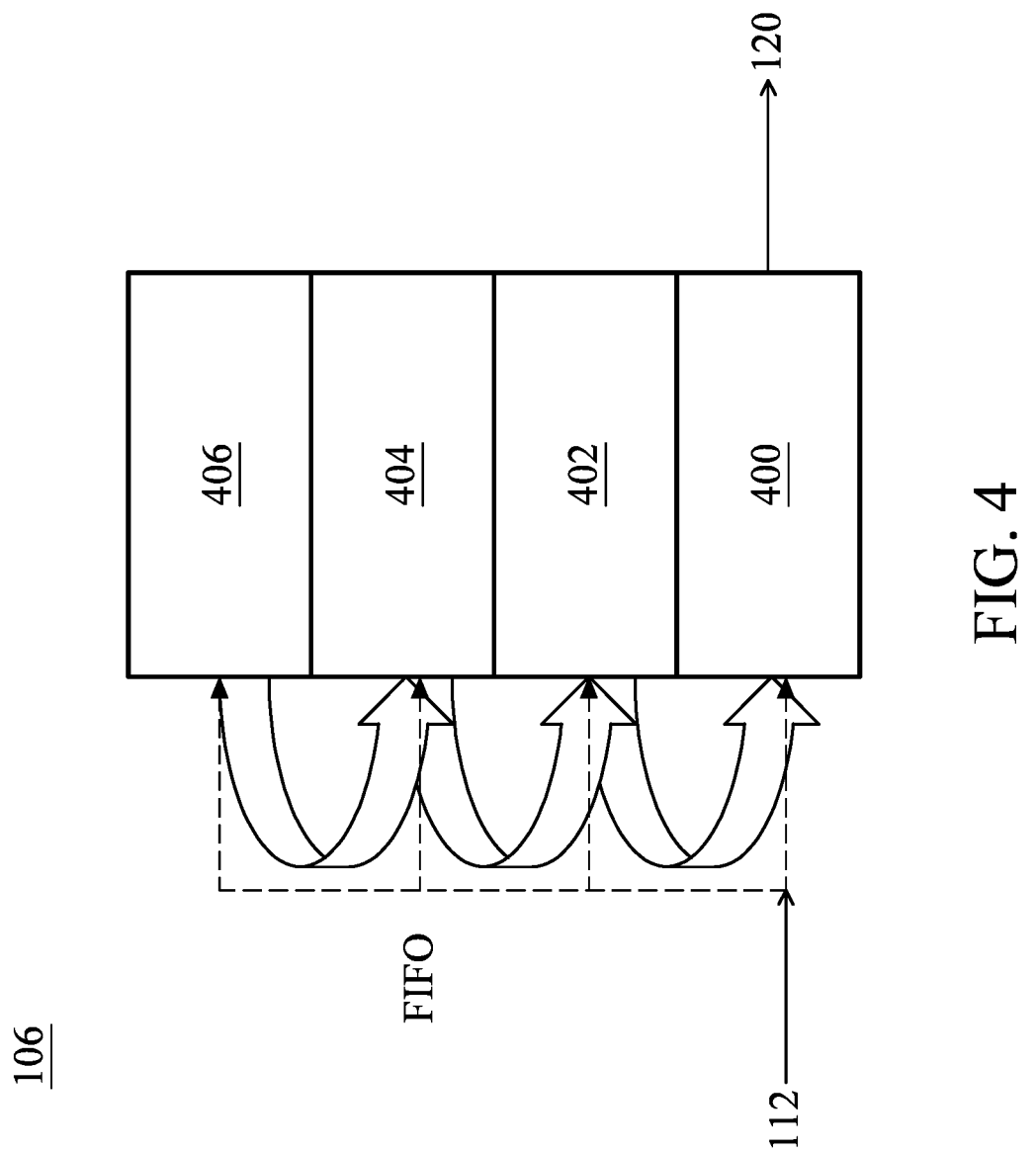
FIG. 4 is a schematic diagram of a buffer unit 106 in FIG. 1 in accordance with some embodiments of the present disclosure.

FIG. 4 is a schematic diagram of a buffer unit 106 in FIG. 1 in accordance with some embodiments of the present disclosure. As shown in FIG. 4, the buffer unit 106 indicates four buffer blocks, such as a buffer block 400, a buffer block 402, a buffer block 404, and a buffer block 406. In some embodiments, the buffer unit 106 is coupled to the control unit 104 to receive the transmission data 112 from the control unit 104. If the buffer unit 106 is not storing any transmission data at this time, the buffer unit 106 preferentially stores the transmission data 112 in the buffer block 400 and outputs the transmission data 112 according to the communication protocol (e.g., UART). If the buffer block 400 of the buffer unit 106 already stores other transmission data, the buffer unit 106 stores the transmission data 112 in the buffer block 402. Similarly, if other transmission data are stored in the buffer block 400 and the buffer block 402 of the buffer unit 106 at this time, the buffer unit 106 stores the transmission data 112 in the buffer block 404. If other transmission data are stored in the buffer block 400, the buffer 402, and the buffer 404 of the buffer unit 106 at this time, the buffer unit 106 stores the transmission data 112 in the buffer block 406.

In some embodiments, when the buffer block 400, the buffer block 402, the buffer block 404 and the buffer block 406 of the buffer unit 106 all store the data, the buffer unit 106 first outputs the transmission data stored in the buffer block 400 (e.g., outputs the transmission data 120) according to the communication protocol, moves the transmission data stored in the buffer block 402 to the buffer block 400, moves the transmission data stored in the buffer block 404 to the buffer block 402, and move the transmission data stored in the buffer block 406 to the buffer block 404, so that the buffer block 406 is free up to store another transmission data from the control unit 104. Therefore, the buffer unit 106 may perform FIFO operations on the transmission data 112.

Table 1 is an example of the control unit 104 of the microcontroller 100 in FIG. 1 outputting the transmission data 112. In Table 1, it is assumed that the data datum 204 in the transmission data 112 has one character, which is used to indicate the states of four signals, such as signal #1, signal #2, signal #3, and signal #4. The starting timestamp and the starting signal are both 0, and the signal may be expressed in binary, decimal, or hexadecimal, but the present disclosure is not limited thereto.

TABLE 1

| Transmission data 112 | Timestamp 202 | Signal #1 | Signal #2 | Signal #3 | Signal #4 |
|---|---|---|---|---|---|
| 1 | 00000F0 | 1 | 0 | 0 | 0 |
| 2 | 0001000 | 1 | 0 | 1 | 0 |
| 3 | 0000300 | 1 | 1 | 1 | 0 |
| 4 | A00F005 | 1 | 1 | 1 | 1 |

As shown in Table 1, when the count value 116 of the timestamp 202 reaches 00000F0, the control unit 104 of the microcontroller 100 detects that the state transition on the signal #0 occurs (from 0 to 1), and the states of the signals #2 to #4 are still 0. The signal datum 204 is sorted according to the signals #4 to #1, the hexadecimal representation of the signal datum 204 is 1, and the data content of the transmission data 112 output by the control unit 104 is %00000F01. The counting unit 102 resets the timestamp 202 to zero according to the reset signal 114 of the control unit 104. After that, when the count value 116 of the timestamp 202 reaches 0001000, the counting unit 104 of the microcontroller 100 detects that the state transition occurs on the signal #3 (from 0 to 1). The data content of the transmission data 112 output by the control unit 104 is %00010005, and the counting unit 102 resets the timestamp 202 to zero according to the reset signal 114 of the control unit 104.

After that, the control unit 104 of the microcontroller 100 detects that the state transition on the signal #2 occurs (from 0 to 1) when the count value 116 of the timestamp 202 reaches 0000300. The data content of the transmission data 112 output by the control unit 104 is %00003007, and the counting unit 102 resets the timestamp 202 to zero again according to the reset signal 114 of the control unit 104. Finally, when the count value 116 of the timestamp 202 reaches A00F005, the control unit 104 of the microcontroller 100 detects that the state transition on the signal #4 occurs (from 0 to 1). The data content of the transmission data 112 output by the control unit 104 is % A00F005F, and the counting unit 102 resets the timestamp 202 to zero according to the reset signal 114 of the control unit 104.

Table 2 is another example of the control unit 104 of the microcontroller 100 in FIG. 1 outputting the transmission data 112.

TABLE 2

| Transmission data 112 | Timestamp 202 | Signal #1 | Signal #2 | Signal #3 | Signal #4 | Signal #5 | Signal #6 | Signal #7 | Signal #8 |
|---|---|---|---|---|---|---|---|---|---|
| 1 | 00000F0 | 1 | 0 | 0 | 0 | 0 | 0 | 0 | 0 |
| 2 | 0001000 | 1 | 0 | 1 | 0 | 0 | 0 | 0 | 0 |
| 3 | 0000300 | 1 | 1 | 1 | 0 | 0 | 0 | 0 | 0 |
| 4 | A00F005 | 1 | 1 | 1 | 1 | 0 | 0 | 0 | 0 |

TABLE 2-continued

| Transmission data 112 | Timestamp 202 | Signal #1 | Signal #2 | Signal #3 | Signal #4 | Signal #5 | Signal #6 | Signal #7 | Signal #8 |
|---|---|---|---|---|---|---|---|---|---|
| 5 | FFFFFFF | 1 | 1 | 1 | 1 | 0 | 0 | 0 | 0 |
| 6 | 00000D0 | 1 | 1 | 1 | 1 | 0 | 0 | 0 | 1 |
| 7 | 00B7903 | 1 | 1 | 1 | 1 | 0 | 1 | 0 | 1 |
| 8 | 0006ED0 | 1 | 1 | 1 | 1 | 1 | 1 | 0 | 1 |
| 9 | C3502F4 | 1 | 1 | 1 | 1 | 1 | 1 | 1 | 1 |

As shown in Table 2, when the count value 116 of the timestamp 202 reaches 00000F0, the control unit 104 of the microcontroller 100 detects that the state transition on the signal #1 occurs (from 0 to 1), and the signals #2 to #8 are still 0. The signal datum 204 is sorted according to the signal #8 to the signal #1, and the hexadecimal representation of the datum 204 is 01. The data content of the transmission data 112 output by the control unit 104 is %00000F001, and the counting unit 102 resets the timestamp 202 to zero according to the reset signal 114 of the control unit 104. Then, when the count value 116 of the timestamp 202 reaches 0001000, the control unit 104 of the microcontroller 100 detects that the state transition on the signal #3 occurs (from 0 to 1). The data content of the transmission data 112 output by the control unit 104 is %000100005, and the counting unit 102 resets the timestamp 202 to zero according to the reset signal 114 of the control unit 104. Furthermore, when the count value 116 of the timestamp 202 reaches 0000300, the control unit 104 of the microcontroller 100 detects that the state transition on the signal #2 occurs (from 0 to 1). The data content of the transmission data 112 output by the control unit 104 is %000030007, and the counting unit 102 resets the timestamp 202 to zero according to the reset signal 114 of the control unit 104.

After that, when the count value 116 of the timestamp 202 reaches A00F005, the control unit 104 of the microcontroller 100 detects that the state transition on the signal #4 occurs (from 0 to 1). The data content of the transmission data 112 output by the control unit 104 is % A00F0050F, and the counting unit 102 resets the timestamp 202 to zero according to the reset signal 114 of the control unit 104. When the count value 116 of the timestamp 202 reaches FFFFFFF, the control unit 104 of the microcontroller 100 does not detect any state transition of the signals. The data content of the transmission data 112 output by the control unit 104 is % FFFFFFF0F, and the counting unit 102 resets the timestamp 202 to zero according to the reset signal 114 of the control unit 104.

Furthermore, when the count value 116 of the timestamp 202 reaches 00000D0, the control unit 104 of the microcontroller 100 detects that the state transition on the signal #8 occurs (from 0 to 1). The data content of the transmission data 112 output by the control unit 104 is %00000D08F, and the counting unit 102 resets the timestamp 202 to zero according to the reset signal 114 of the control unit 104. Then, when the count value 116 of the timestamp 202 reaches 00B7903, the control unit 104 of the microcontroller 100 detects that the state transition on the signal #6 occurs (from 0 to 1). The data content of the transmission data 112 output by the control unit 104 is %00B7903AF, and the counting unit 102 resets the timestamp 202 to zero according to the reset signal 114 of the control unit 104.

After that, when the count value 116 of the timestamp 202 reaches 0006ED0, the control unit 104 of the microcontroller 100 detects that the state transition on the signal #5 occurs (from 0 to 1). The data content of the transmission data 112 output by the control unit 104 is %0006ED0BF, and the counting unit 102 resets the timestamp 202 to zero according to the reset signal 114 of the control unit 104. Finally, when the count value 116 of the timestamp 202 reaches C3502F4, the control unit 104 of the microcontroller 100 detects that the state transition on the signal #7 occurs (from 0 to 1). The data content of the transmission data 112 output by the control unit 104 is % C3502F4FF, and the counting unit 102 resets the timestamp 202 to zero according to the reset signal 114 of the control unit 104.

Figure 5:
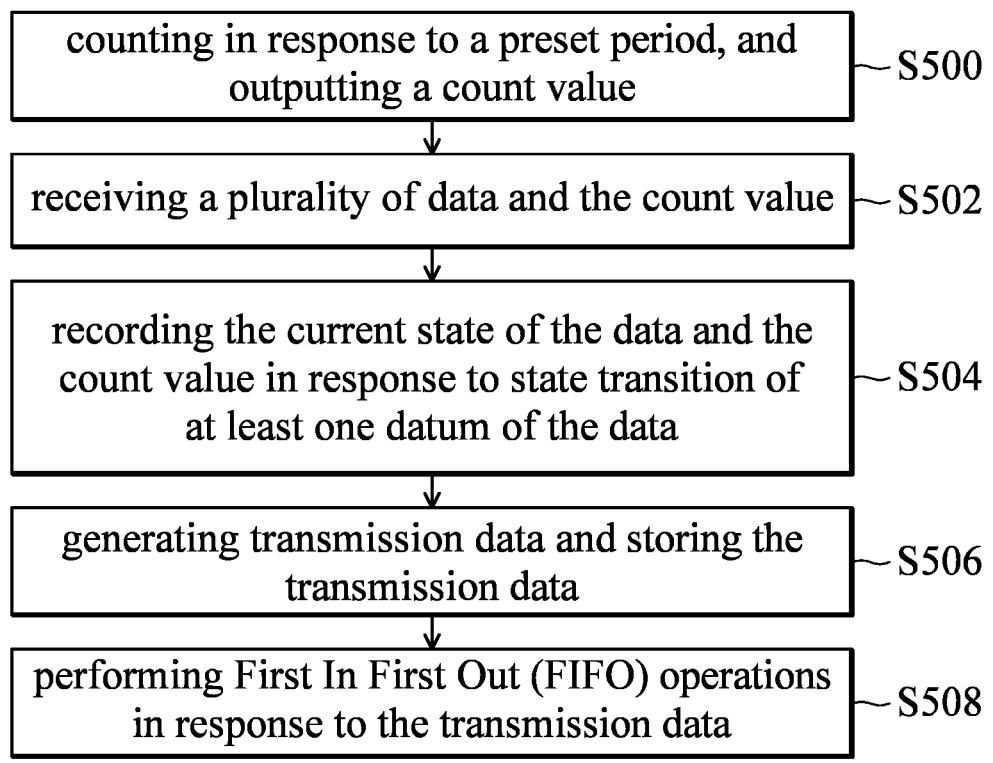
FIG. 5 is a flowchart of a method for logic analysis in accordance with some embodiments of the present disclosure.

FIG. 5 is a flowchart of a method for logic analysis in accordance with some embodiments of the present disclosure. As shown in FIG. 5, the method for logic analysis of the present disclosure includes the stages as detailed in the following paragraph. The method counts in response to a preset period, and outputs a count value (step S500). A plurality of data and the count value are received (step S502). The current state of the data and the count value are recorded in response to state transition of at least one datum (step S504). Transmission data are generated and the transmission data are stored (step S506). FIFO operations are performed in response to the transmission data (step S508).

In some embodiments, step S500 is performed by the counting unit 102 of the microcontroller 100 in FIG. 1. Steps S502, S504, and S506 are performed by the control unit 104 of the microcontroller 100 in FIG. 1. Step S508 is performed by the buffer unit 106 of the microcontroller 100 in FIG. 1. In some embodiments, step S508 includes performing FIFO operations on the transmission data according to the sequence of the count value in the transmission data. In some embodiments, the method for logic analysis of the present disclosure further includes resetting the count value to zero in response to the state transition of at least one datum. In some embodiments, the state transition of all the data does not occur, in which case the method for logic analysis of the present disclosure further includes resetting the count value to zero once the count value reaching the maximum value.

Figure 6:
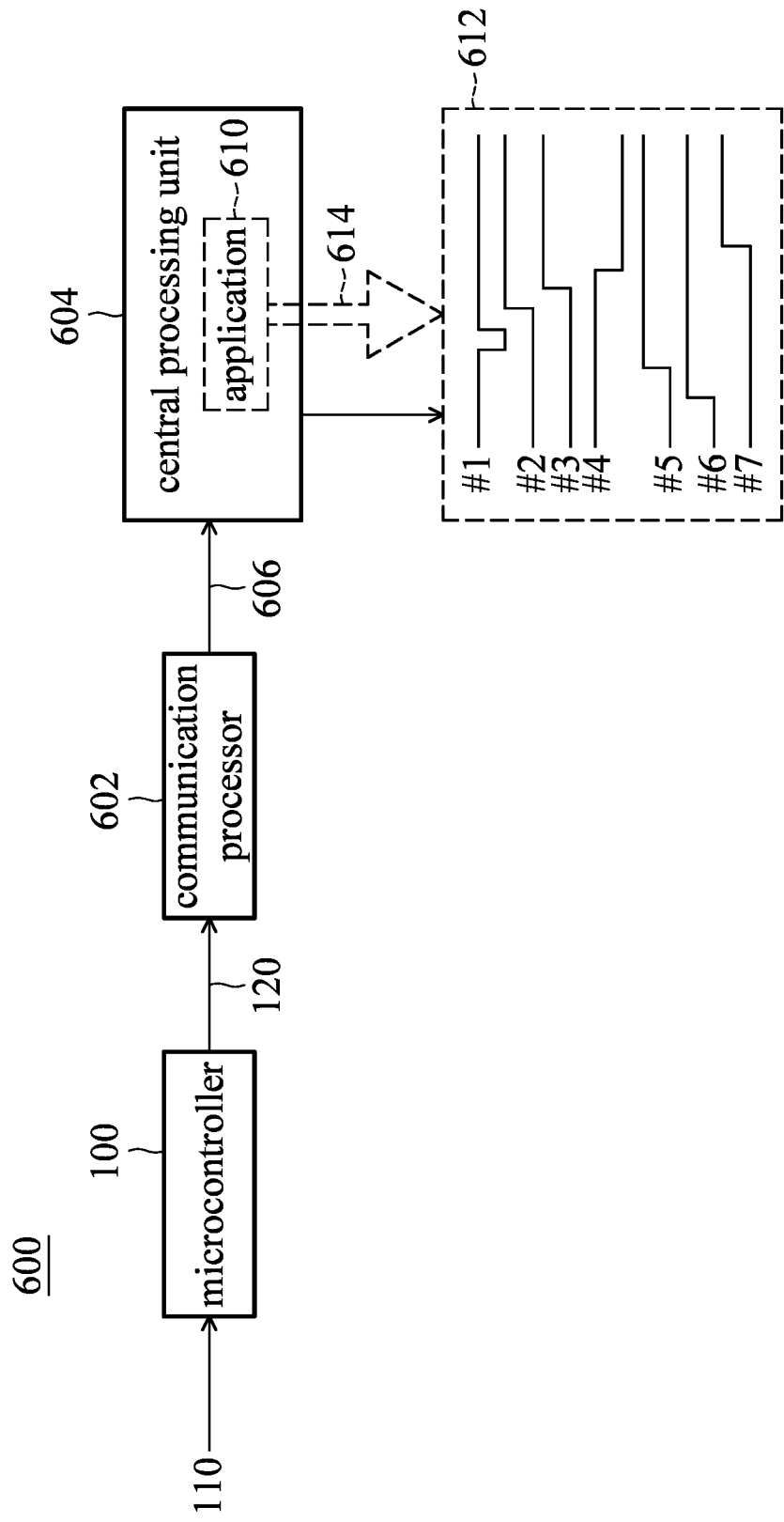
FIG. 6 is a schematic diagram of an electronic system 600 for logic analysis in accordance with some embodiments of the present disclosure.

FIG. 6 is a schematic diagram of an electronic system 600 for logic analysis in accordance with some embodiments of the present disclosure. As shown in FIG. 6, the electronic system 600 includes the microcontroller 100 in FIG. 1, a communication processor 602, a central processing unit 604, and a display 612. In some embodiments, the microcontroller 100 counts with a preset period and receives a plurality of data 110 from the electronic system 600. In response to state transition of at least one datum, the microcontroller 100 records the current state of the data and the count value. The microcontroller 100 thereby generates transmission data 120, on which it then performs FIFO operations.

The communication processor 602 is coupled to the microcontroller 100 to receive the transmission data 120 from the microcontroller 100, and to decode the transmission data 120 to generate decoded data 606. In other words, the decoded data 606 also records the current state of the data 110 and the count value. In some embodiments, the communication processor 602 may be, for example, a processor of a UART dongle, but the present disclosure is not limited thereto. The communication processor 602 may communicate with the central processing unit 604 through a communication protocol (for example, USB).

The central processing unit 604 is coupled to the communication processor 602, and performs an application 610 to generate a user-interface signal 614. In some embodiments, the central processing unit 604 is a central processing unit of an electronic device, but the present disclosure is not limited thereto. In some embodiments, the electronic device may be, for example, a desktop, a laptop, a smart phone, a tablet, and a server, but the present disclosure is not limited thereto. The display 612 is coupled to the central processing unit 604 to display according to the user-interface signal 614. The central processing unit 604 reads the decoded data 606 from the communication processor 602, and displays waveforms of the data 110 correspondingly through the display 612 according to the state of the data 110 and the count value. In some embodiments, the central processing unit 604 may be a processor in the desktop, the laptop, the smart phone, or the server, but the present disclosure is not limited thereto. In some embodiments, after the central processing unit 604 receives the decoded data 606 from the communication processor 602, the central processing unit 604 correspondingly generates a log file. The user loads the log file through the display 612, so that the waveform diagram of the data 110 may be displayed on the display 612. In some embodiments, the display 612 may include a user interface, a panel, a tablet, or a screen, or may be integrated with central processing unit 604, but the present disclosure is not limited thereto.

For example, it is assumed that the data 110 include the signal #1, the signal #2, the signal #3, and the signal #4 in Table 1. Therefore, the central processing unit 604 may combine the timestamps of the signal #1, the signal #2, the signal #3, and the signal #4, and depict the state transition of the signal #1, the signal #2, the signal #3, and the signal #4 at the corresponding timestamps, thereby generating the user-interface signal 614 including the state transition of the signal #1, the signal #2, the signal #3, and the signal #4.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A microcontroller for logic analysis, comprising:
a counting unit, counting with a preset period and outputting a count value;
a control unit, coupled to the counting unit, receiving a plurality of data and the count value; and
a buffer unit, coupled to the control unit, performing First In First Out (FIFO) operations,
wherein in response to state transition of at least one datum of the data, the control unit records the current state of the data and the count value and thereby to generate transmission data, and the control unit stores the transmission data in the buffer unit;
wherein the buffer unit performs the First In First Out operations according to a sequence of the count value in the transmission data; and
wherein the count value represents a time that the state transition of the at least one datum of the data occurs.

2. The microcontroller as claimed in claim 1, wherein the transmission data comprises:
an indicator, which is the starting character of the transmission data;
a timestamp, which is the count value when the state transition of the at least one datum occurs; and
a signal datum, which is the state of the data when the state transition of the at least one datum of the data occurs.

3. The microcontroller as claimed in claim 1, wherein the buffer unit performs FIFO operations on the transmission data according to the sequence of the count value in the transmission data.

4. The microcontroller as claimed in claim 1, wherein the state transition of the at least one datum of the data occurs, the control unit outputs a reset signal to the counting unit, and the counting unit resets the count value to zero in response to the reset signal.

5. The microcontroller as claimed in claim 1, wherein the state transition of all the data does not occur, the count value of the counting unit is a maximum value, the control unit outputs a reset signal to the counting unit, and the counting unit resets the count value to zero in response to the reset signal.

6. The microcontroller as claimed in claim 1, wherein the preset period is 10 nanoseconds.

7. The microcontroller as claimed in claim 2, wherein the length of the indicator is one character long, the length of the timestamp is seven characters long, and the length of the signal datum is at least one character long.

8. The microcontroller as claimed in claim 7, wherein one character in the signal datum indicates the states of four data in the data.

9. The microcontroller as claimed in claim 1, wherein the state transition of the at least one datum of the data is to convert from a logic low level to a logic high level, or from the logic high level to the logic low level.

10. A method for logic analysis, comprising:
counting, via a counting unit, in response to a preset period, and outputting, via the counting unit, a count value;
receiving a plurality of data and the count value via a control unit;
recording, via the control unit, the current state of the data and the count value in response to state transition of at least one datum of the data;
generating transmission data via the control unit and storing the transmission data to a buffer unit; and
performing First In, First Out (FIFO) operations, via the buffer unit, in response to the transmission data,
wherein the count value represents a time that the state transition of the at least one datum of the data occurs; and
wherein the buffer unit performs the First In First Out operations according to a sequence of the count value in the transmission data.

11. The method as claimed in claim 10, wherein the step of generating the transmission data comprises:
indicating the starting character of the transmission data by using an indicator;
recording the count value when the state transition of the at least one datum of the data occurs by using a timestamp; and recording the state of the data when the state transition of the at least one datum of the data occurs by using a signal datum.

12. The method as claimed in claim 10, wherein the step of performing FIFO operations in response to the transmission data comprises:
performing FIFO operations on the transmission data according to the sequence of the count value in the transmission data.

13. The method as claimed in claim 10, further comprising:
resetting the count value to zero in response to the state transition of at least one datum of the data.

14. The method as claimed in claim 10, further comprising:
resetting the count value to zero in response to the count value reaching the maximum value, wherein the state transition of all the data does not occur.

15. The method as claimed in claim 10, wherein the preset period is 10 nanoseconds.

16. The method as claimed in claim 11, wherein the length of the indicator is one character long, the length of the timestamp is seven characters long, and the length of the signal datum is at least one character long.

17. The method as claimed in claim 16, wherein one character in the signal datum indicates the states of four data in the data.

18. The method as claimed in claim 10, wherein the state transition of at least one datum of the data is to convert from a logic low level to a logic high level, or from the logic high level to the logic low level.

19. An electronic system for logic analysis, comprising:
a microcontroller, comprising:
a counting unit, counting with a preset period;
a control unit, receiving a plurality of data, wherein in response to state transition of at least one datum of the data, the control unit records the current state of the data and the count value and thereby to generate transmission data; and
a buffer unit, performs First In, First Out (FIFO) operations,
wherein the count value represents a time that the state transition of the at least one datum of the data occurs; and
wherein the buffer unit performs the First In First Out operations according to a sequence of the count value in the transmission data;
a communication processor, coupled to the microcontroller, receiving the transmission data from the microcontroller and decoding the transmission data to generate decoded data;
a central processing unit, coupled to the communication processor, performing an application to generate a user-interface signal; and
a display, coupled to the central processing unit, displaying according to the user-interface signal; wherein the central processing unit reads the decoded data and displays waveforms of the data correspondingly through the display according to the state of the data and the count value.

20. The electronic system as claimed in claim 19, wherein the transmission data comprise:
an indicator, which is the starting character of the transmission data;
a timestamp, which is the count value when the state transition of the at least one datum occurs; and
a signal datum, which is the state of the data when the state transition of the at least one datum of the data occurs.

* * * * *